United States Patent

Passmore

[15] 3,636,303
[45] Jan. 18, 1972

[54] APPARATUS FOR METAL VAPORIZATION COMPRISING A REDUCED CROSS SECTION HEATER AND A REFRACTORY VESSEL

[72] Inventor: Edmund M. Passmore, Wilmington, Mass.
[73] Assignee: GTE Sylvania Incorporated
[22] Filed: Mar. 10, 1971
[21] Appl. No.: 122,792

[52] U.S. Cl. ...........................219/271, 118/48, 219/275
[51] Int. Cl. ..........................................................C23c 13/02
[58] Field of Search............219/271, 272, 275, 426, 538, 219/544, 553; 13/25; 118/48, 49, 49.1; 21/119; 117/107

[56] References Cited

UNITED STATES PATENTS

| | | | |
|---|---|---|---|
| 2,772,318 | 11/1956 | Holland | 13/25 |
| 3,514,575 | 5/1970 | Hall et al. | 219/275 |
| 3,515,852 | 6/1970 | Matheson et al. | 219/275 |
| 3,541,301 | 11/1970 | Gallet | 219/271 |

Primary Examiner—C. L. Albritton
Attorney—Norman J. O'Malley and James Theodosopoulos

[57] ABSTRACT

An improved evaporation source for vacuum deposition of metals comprises a refractory vessel heated and supported by a separate heater. The vessel has a cavity to contain the metal to be evaporated and has a uniform wall thickness beneath the cavity. The heater comprises an electrically conductive refractory material shaped so as to support the vessel only at the ends thereof but to be in efficient heat transfer relationship therewith. Additionally, the heater has a reduced cross section between its ends in order to provide higher end contact area than cross-sectional area and to also prevent buckling when the heater is supported by axial compressive contacts.

10 Claims, 4 Drawing Figures

PATENTED JAN 18 1972
3,636,303
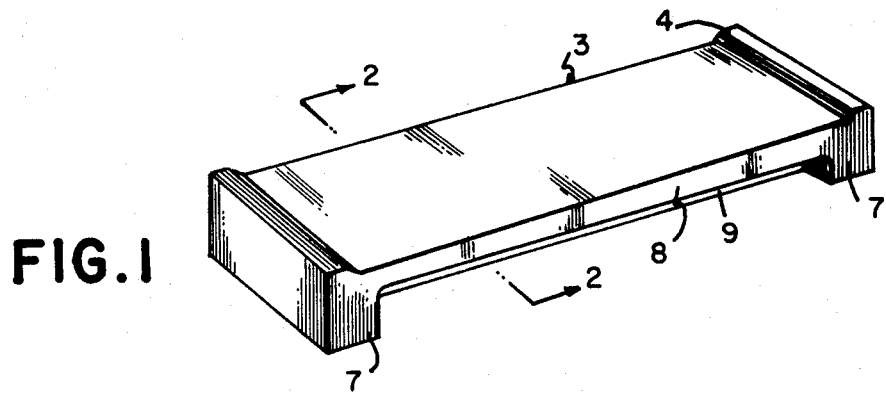
FIG.1
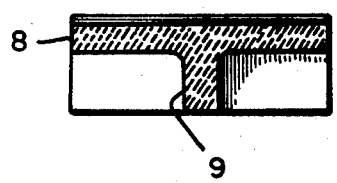
FIG.2
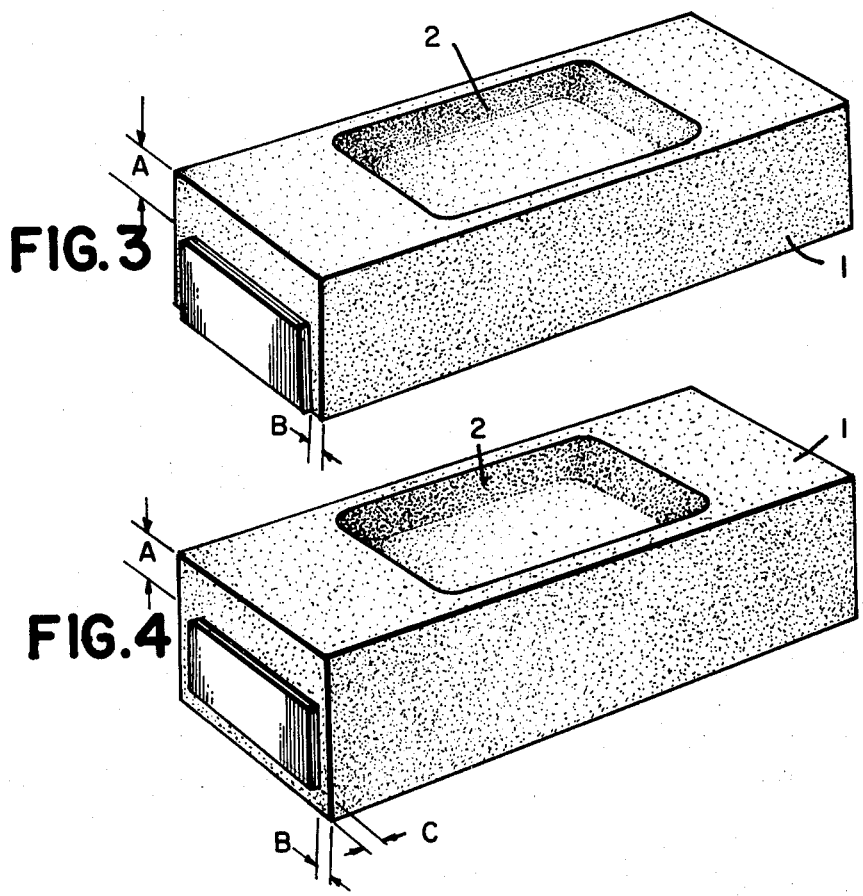
FIG.3
FIG.4
EDMUND M. PASSMORE
INVENTOR
BY James Theodosopoulos
ATTORNEY 3,636,303

APPARATUS FOR METAL VAPORIZATION COMPRISING A REDUCED CROSS SECTION HEATER AND A REFRACTORY VESSEL

BACKGROUND OF THE INVENTION

1. Field of the Invention

This invention relates to evaporation sources such as are used in vacuum metallizing apparatus. It particularly concerns such sources which comprise a refractory vessel heated by a separate heater, in contradistinction to vessels which are self-resistant heating.

2. Description of the Prior Art

Evaporation sources for vacuum metallizing processes, such as for the continuous deposition of aluminum on, for example, rolls of plastic film, generally comprise a refractory vessel to contain the metal to be evaporated or to which the metal can be fed, for example, from a spool of wire. Such vessels can be either self-resistance heated or can be heated by a separate heater.

Examples of the former are shown in U.S. Pat. Nos. 2,730,986, 2,866,724, 2,903,544, 2,962,538, 2,984,807, 3,181,968, 3,216,710 and 3,544,486. The vessels disclosed in these patents are electrically conductive and are heated by passing electric current therethrough.

Examples of the latter are shown in U.S Pat. Nos. 2,772,318, 3,063,865, 3,373,260, 3,514,575 and 3,515,852. In these patents, the vessel and the heater comprise separate bodies, the vessel comprising material that is resistant to the metal to be evaporated and the heater comprising material suitable for electrical heating, induction heating and the like.

As shown in the latter patents, a two component system, that is, a system comprising a separate vessel and a separate heater, is desirable, since the material for each component can be selected for its optimum properties.

Although known two component metal evaporating sources may be satisfactory for many applications, it is an object of this invention to describe and improved metal evaporating source having advantages not shown by the prior art.

One of the problems of prior art two component sources results from contact between the vessel and heater at the hottest regions thereof. Since the vessel and the heater generally comprise different materials and since the operating temperature at the region of contact is generally extremely hot, say, about 1,400° to 2600° C., a reaction can occur between the heater and the vessel at the region of contact which can cause premature failure of the evaporating source.

For example, if the vessel is made of boron nitride and the heater is made of graphite, a reaction can occur between them at the hot points of contact, producing boron carbide. Premature failure can occur from such a reaction because of, inter alia, thermal cracking of either the vessel or the heater.

Similarly, a reaction between a boron nitride vessel and a tungsten heater, at the hot point of contact therebetween, can produce tungsten boride and cause premature failure. Similar reactions can occur between aluminum oxide vessels and graphite heaters or titanium boride containing vessels and tungsten heaters. It can be seen, then, that it would be desirable to avoid all physical contact between vessel and heater at the hot regions thereof, even point contact such as is shown in U.S. Pat. No. 2,772,318.

Another disadvantage of prior art evaporation apparatus resulted from the method of connecting a heater to electrical posts within a vacuum chamber. Generally, the ends of the heater were clamped between substantially rigid jaws mounted on the electrical posts, the effect of which was to impart undesirable stresses on the heater, which, in turn, could cause fracture of the heater during normal operational thermal cycling thereof. Flexible mounting of the jaws does not completely eliminate the stress problem, since the size of the electrical conductor necessary for evaporation apparatus precludes use of a mount sufficiently flexible to eliminate substantially all tensile and shear stresses, which stresses are more likely to result in heater fracture than is compressive stress.

Still another disadvantage of prior art two component evaporating sources is a nonuniformity in thickness of the cavity portion of the vessel and, specifically, in the thickness of material between the evaporating surface of the cavity and the heater. Nonuniform thickness in this critical region can yield undesirable hot spots in the cavity and can also cause cracking of the vessel, a result of high transverse thermal gradients and nonuniform thermal expansion.

Other disadvantages of said sources include: low thermal efficiency, because of excessive radiation losses in the heater or inefficient heat transfer from the heater to the vessel; undesirable heating of the material (i.e., plastic film) to be coated because of direct exposure thereof to the heater; insufficient protection of the heater from the metal being evaporated; and low evaporation rates in relation to the size of the vessel and heater.

SUMMARY OF THE INVENTION

A metal evaporating source in accordance with this invention consists of a two component system, that is, a separate elongated vessel and a separate elongated heater. The vessel is made of refractory material suitably resistant to the metal to be evaporated and has a relatively large but shallow cavity centrally disposed on the upper surface thereof. The purpose of the cavity is to contain said metal, the bottom of the cavity being the surface at which substantially all metal evaporation occurs. Said cavity surface is parallel to the bottom surface of the vessel, the reason being to provide substantially uniform material thickness therebetween. Such uniformity overcomes disadvantages mentioned above under "Description of the Prior Art," namely, it eliminates hot spots within the cavity and it eliminates thermal cracking due to nonuniform thickness.

The heater is made of electrically conductive material capable of being resistance heated to high temperatures, In addition, the heater should have sufficient mechanical strength to be self-supporting and to also support the vessel.

The vessel and the heater are of such configuration that there is no physical contact therebetween at the high temperature regions thereof, that is to say, in the cavity region of the vessel. However the gap between the vessel and heater at this region is small for the purpose of efficient transfer of heat from the heater to the vessel.

There is physical contact between the vessel and heater at or near the ends of each, that is to say, beyond the cavity region of the vessel, the vessel being supported by the heater in this manner. Such physical contact occurs at areas that are considerably cooler than the central portions of each and where the likelihood of reaction between heater and vessel is greatly reduced. Shoulders may be provided in either the vessel or the heater at the ends thereof or suitable inserts may be used in order to prevent physical contact between the vessel and the heater at the central portions thereof.

The shape of the heater is such as to provide higher end contact area than intermediate cross-sectional area and to also prevent buckling when the heater is mounted between spring loaded electrical posts that exert an axial compressive force on the heater. For this purpose the ends of the heater are substantially the fully height and width of the rectangular solid defined by the outside heater dimensions. But intermediate said ends, the heater has a reduced cross section. In order that the temperature of the intermediate portion of the heater be sufficiently high for purposes of this invention while maintaining the temperature of the ends of the heater low enough to prevent substantial reaction with the vessel supported thereon, the intermediate cross-sectional area should be less than about two-thirds that of the end sections. However, in order to provide adequate strength to withstand the axial compressive force of the spring loaded electrical posts, one or more intermediate portions, preferably symmetrical portions, should extend substantially the full height of the heater, excluding, of course, the shoulder heights. In addition, the upper surface of the heater should be substantially planar and should extend substantially the full width of the heater, for efficient heat transfer to the vessel. Thus the heater can be T-shaped or U-shaped or variations thereof.

The vessel surrounds the heater on at least three longitudinal sides, that is to say, on the upper surface and both longitudinally extending vertical surfaces, for the purpose of efficient heat transfer from the heater to the vessel and also to reduce radiation losses from the heater. Depending on the operating temperature and the likelihood of reaction between vessel and heater, there may or may not be physical contact between the heater and said vertical surfaces. However, contact therebetween can be avoided by suitable shoulders or inserts which permit physical contact at the ends only.

In order to improve thermal efficiency and to prevent exposure of the material to be coated, e.g., plastic film, to direct radiation from the heater, the heater should extend beyond the ends of the vessel only enough to be supported between spring loaded compressive electrical binding posts of suitable vacuum apparatus.

Since the vessel almost completely shields the heater from the metal to be evaporated, even in situations where the cavity becomes filled with liquid metal because of improper operation and the metal overflows, there is little likelihood of corrosion of the heater by the metal. However, in some cases, liquid metal, especially aluminum, can creep along the surface of an evaporating vessel. Thus, it may be desirable to provide suitable grooves in the vessel in order to reduce the possibility of metal flowing to the end of the vessel where it could contact the heater.

BRIEF DESCRIPTION OF THE DRAWING

FIGS. 1 and 2 are perspective and cross sectional views, respectively, of a heater in accordance with this invention.

FIGS. 3 and 4 are perspective views of vessels that can be used with the heater of FIGS. 1 and 2. DESCRIPTION OF THE PREFERRED EMBODIMENTS An evaporating vessel represented as 1 and 1' in FIGS. 3 and 4 respectively, is elongated in shape and is made of refractory material suitable resistant to a predetermined evaporatable metal. Although the vessel will be described with particular reference to vessel 1 of FIG. 3, the corresponding element in vessel 1' of FIG. 4 will be designated by the same number or letter with the addition of the symbol '. Centrally disposed on the upper surface of vessel 1 is cavity 2, substantially uniform in shape. Cavity 2 is relatively large in relation to vessel 1 in order to provide a large evaporation surface and, therefore, a high evaporation rate for a given cavity surface temperature. Thus, the width of cavity 2 could be as high as 90 or 95 percent of the width of the vessel 1, the remaining wall thickness being only sufficient to be structurally sound.

The length of cavity 2 can be three-fourths, or even greater, of the length of vessel 1, dependent on the strength of the material comprising vessel 1. However, at cavity lengths greater than about three-fourths, there can be an excessive temperature variation along the length of cavity 2, the ends thereof being cooler than the center. Thus, if cavity 2 is tool long in relation to vessel 1, the ends of cavity 2, in some cases, may be at a sufficiently high temperature to evaporate metal thereat. Also, the length of cavity 2 should not be so long that the ends of vessel 1, where said vessel is supported, operate at an undesirably high temperature, that is to say, at a temperature at which substantial reaction occurs between vessel 1 and heater 3.

In evaporation apparatus where metal, e.g., aluminum, is continuously fed to cavity 2 from a spool of wire within a vacuum chamber, relatively large cavity 2 offers additional advantages. It can accommodate the end of the wire as the wire is unreeled from the spool and directed into cavity 2, said end tending to wander throughout the process. And it dampens, to the extent of providing a uniform evaporation rate, the somewhat erratic unreeling of the wire spool, erratic because of the mechanical drives employed in the unreeling operation.

The material thickness at the bottom of cavity 2 is substantially uniform throughout, for reasons mentioned above. However, for highest cavity temperatures with minimum radiation losses from the upper surface of vessel 1, said thickness should be between about one-third and two-thirds of the thickness of the upper section each other. vessel 1, that is to say, of section A, the upper and lower surfaces of section A, in addition to the bottom of cavity 2, being substantially parallel to each other.

Vessel 1 can be channel-shaped, as shown in FIG. 3, having two longitudinally extending vertical sections B which are integral parts of vessel 1. The channel defined by section A and sections B of vessel 1 is of such a size as to provide only slight clearance when heater 3, shown in FIG. 1, is inserted therein. Or vessel 1' can be a substantially rectangular solid, as shown in FIG. 4, having a rectangular opening extending longitudinally therethrough. The opening is bounded by upper section A', vertical sections B' and lower section C' of vessel 1' and is of such a size as to provide only slight clearance when heater 3, shown in FIG. 1, is inserted therein.

Heater 3 is elongated in shape and is made of electrically conductive refractory material capable of being resistively heated to temperatures necessary for metal evaporation. The upper surface of heater 3 is substantially flat, corresponding to the lower surface of section A of vessel 1, except for two shoulders 4 at the ends thereof. As previously mentioned, the purpose of shoulders 4 is to support vessel 1 at the ends thereof, there being no physical contact between the lower surface of section A and the upper surface of heater 3 between shoulders 4. The height of shoulders 4 should be only high enough to prevent physical contact between said two surfaces, since excessive height would reduce efficiency of heat transfer therebetween. For example, the height of shoulders 4 can be between 10 and 100 mils.

The ends of heater 3 should extend slightly beyond the corresponding ends of vessel 1 in order to provide for suitable connection thereof to compressive electrical binding posts in a vacuum chamber.

In one embodiment of an evaporating source in accordance with this invention, shown in FIG. 3, vessel 1 was made of boron nitride and was 2⅝ inches long by 1¼ inches wide by ½ inch high. Cavity 2 was 1¼ inches long by 1 inch wide by ⅛ inch deep. The thickness of sections A and B was three-sixteenth inch.

Heater 3, shown in FIGS. 1 and 2, was made of graphite and was 2½ inches long by ⅞ inch wide by 5/16 inch high. At each end of heater 3 was shoulder 4 extending across the full width of heater 3 and longitudinally for one-eighth inch. The height of each shoulder was 20 mils.

Heater 3 was machined from a rectangular block of graphite measuring 2½ inches long by ⅞ inch wide by 5/16 high. The upper surface of heater 3 was machined so that shoulders 4 at each end of heater 3 extended the full width of the heater for a longitudinal distance of one-eighth inch and also extended 20 mils above the major radiating surface of heater 3.

The lower surface of heater 3 was machined to provide a T shaped cross section as shown in FIG. 2. Each end 7 of said lower surface was left intact for a longitudinal distance of one-fourth inch, as shown in FIG. 1, but sufficient graphite was removed between said ends so as to leave an upper section heater thickness 8 of one-eighth inch and to leave a centered longitudinal section 9, corresponding to the vertical member of a T-shaped ⅛-inch thick. The ratio of the cross-sectional are of the T to the cross-sectional area of the ends was about one-half.

In operation, heater 3 was supported in an evaporating chamber between axial compressive electrical posts. Vessel 1 was centrally placed on heater 3, the ends of vessel 1 resting on shoulders 4. At a vacuum of $3\times10^{-5}$ Torr, electric current was passed through heater 3. At operating conditions of 5.4 volts and 625 amperes, the heater temperature was 2,100°–2,300° C. and the cavity temperature was 1,500°–1,800° C. Aluminum in the form of 57 mil. wire from a spool within the chamber was fed and evaporated from the cavity at a rate of 1.4 grams per minute.

In another embodiment, shown in FIG. 2, vessel 1 had two transverse grooves 5 and 6 at each end thereof. Grooves 5 were closer to cavity 2 and extended only across the upper surface of vessel 1 while grooves 6 also extended down both vertical surfaces. Grooves 5 and 6 were ⅛-inch wide by ⅛-inch deep. As previously mentioned, the grooves aid in preventing aluminum creeping to the ends of vessel 1.

Although shoulders 4 are shown as part of heater 3, the desired spacing between vessel 1 and heater 3 may be obtained by having the upper surface of heater 3 flat and placing corresponding shoulders at the ends of vessel 1, on the lower surface of section A. Or, if desired, both surfaces may be flat and suitable inserts, made, for example, from 20 mil. thick graphite, may be used to obtain said spacing.

Also, carbides, shoulders 7, either on heater 3 or vessel 1, or even inserts, may be used to prevent contact between the sides of heater 3 and either inner surfaces of sections A, except at the ends thereof.

For evaporating aluminum, boron nitride is especially suitable as the vessel material because of its machinability and resistance to aluminum. However other compositions may be used, either for evaporating aluminum or other metals, such as refractory carbides, borides, nitrides or oxides, for example, tantalum carbide, or mixtures thereof. The composition should be of a type that can be machined, pressed and/or molded into the final desired shape.

A composite vessel consisting of 30 percent titanium diboride, 30 percent boron nitride, 36 percent aluminum nitride and 4 percent boric oxide (percent by weight) was found to be superior to boron nitride for evaporating aluminum, attaining an evaporation rate of 6.0 grams per minute without harmful result. A corresponding boron nitride vessel cracked after a short period of operation at the same evaporation rate.

Graphite is suitable for the heater because of its electrical conductivity, machinability and high emissivity, which improves thermal efficiency. However, other suitable electrically conductive refractory compositions may also be used, such as those containing titanium diboride, an example of which is shown in U.S. Pat. No. 3,544,486. The composition should be of a type that can be machined, pressed and/or molded into the final desired shape. Examples of electrically conductive materials that can be incorporated in such compositions are titanium carbide, molybdenum, carbide, zirconium carbide, tantalum carbide, titanium diboride and zirconium diboride.

I claim:

1. An evaporation source for the vapor deposition of metals comprising: an elongated refractory vessel having an upper section having an upper surface and a lower surface and having a cavity centrally disposed on said upper surface, the wall thickness beneath said cavity being uniform for substantially the entire area of the cavity; and an elongated electrically conductive heater, longer than said vessel, supporting said vessel only at the ends thereof and protruding beyond the ends of said vessel, said heater having an upper portion having an upper surface, said upper surface between the ends of said heater, being proximately spaced from, but parallel to, the lower surface of said upper section, said vessel surrounding said heater on at least three longitudinal sides, the part of said heater between its ends having a cross-sectional area less than about two-thirds that of the ends of said heater.

2. The source of claim 1 wherein the parallel spacing between the upper surface of said heater and the lower surface of said wall thickness is provided by shoulder at the ends of said heater, said shoulders being integral parts of said heater.

3. The source of claim 2 wherein the height of said shoulders is between about 10 and 100 mils.

4. The source of claim 1 wherein the depth of said cavity is from one-half to double said wall thickness.

5. The source of claim 1 wherein length of said cavity is less than about three-fourths of the length of said vessel.

6. The source of claim 1 wherein said heater physically contacts said vessel only at the ends thereof.

7. The source of claim 1 wherein said heater is made of graphite.

8. The source of claim 1 wherein said part of said heater between its end is T shaped.

9. The source of claim 1 wherein said upper portion of said part of said heater extends substantially the full width of said heater.

10. The source of claim 1 wherein at least one section of said part of said heater extends substantially the full height of said heater.

* * * * *